Figure 1:
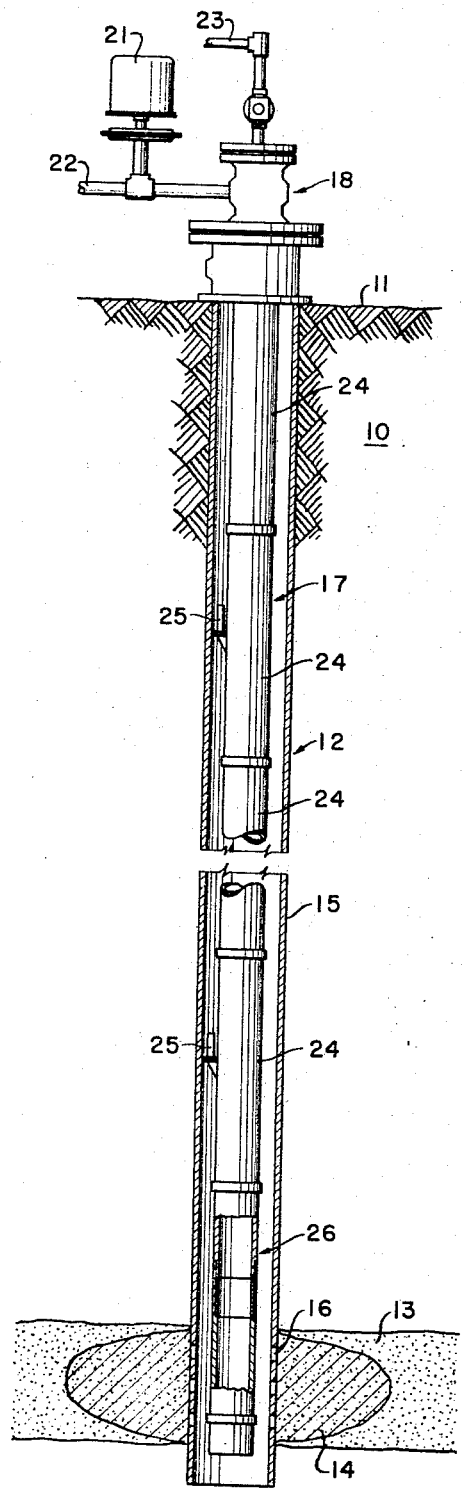

Oct. 17, 1967  P. J. RAIFSNIDER ET AL  3,348,052
MONITORING CORROSION RATES BY MEANS OF RADIOACTIVE TRACERS
Original Filed June 20, 1962

INVENTORS:
PHILIP J. RAIFSNIDER
VINCENT P. GUINN
BY: *John K. Wilkens*
THEIR ATTORNEY 3,348,052
MONITORING CORROSION RATES BY MEANS OF RADIOACTIVE TRACERS
Philip J. Raifsnider, Oklahoma City, Okla., and Vincent P. Guinn, La Jolla, Calif., assignors to Shell Oil Company, New York, N.Y., a corporation of Delaware
Continuation of application Ser. No. 203,958, June 20, 1962. This application June 24, 1965, Ser. No. 469,054
2 Claims. (Cl. 250—106)

This application is a continuation of our copending application Ser. No. 203,958, filed June 20, 1962, and now abandoned.

This invention relates to a process and apparatus for monitoring and controlling the corrosion of materials exposed to corrosive fluid at inaccessible locations and more particularly, it is directed to the use of special radioactive compositions and processes to monitor the corrosion of downhole equipment used in petroleum wells.

Due to the complex nature of the corrosion mechanism, corrosion rates and the effectiveness of corrosion inhibitors can be best determined by exposing the corrodible material to be tested to a corrosive environment in and out the presence of the inhibitors. Although various techniques may be used to observe corrosion rates, the most common technique is to rely on weight loss of a specimen of the corroded material being tested. At inaccessible locations, such as downhole positions in producing wells, these techniques have the obvious disadvantage that corrodible material may not be readily or economically retrieved for the weight loss determination.

Because of the shortcomings of the common weight loss techniques, other types of corrosion monitoring techniques have been developed, one of which is the use of tracers. Typically, tracer techniques rely on the escape and detection of a dye, chemical, or radioactive material upon the termination of predetermined degree of corrosion. For example, see U.S. 2,994,778, issued to Marsh. Such systems have the advantage that the determination may be accomplished at a position remote from the location of corrosion without recovering a test specimen placed downhole, since the tracer is to be carried in a fluid recovered from the well. However, these systems have the disadvantage that they merely indicate the point at which a preselected degree of corrosion has taken place. After such a point, or points, the tracer no longer serves as a useful indication of further or continued corrosion. Thus, the use of known available tracer techniques are not compatible with continuous monitoring of corrosion unless the tracer units be replenished at intervals. Such replenishment has the disadvantage that gives only stepwise monitoring of corrosion without indicating changes in the corrosion rate as they occur. Further, replacement of tracer units is difficult and time consuming in cases where the location of corrosion determination is not readily accessible, such as a downhole in oil wells.

Tracers have also been incorporated into corrosion inhibitors to monitor the concentration of the inhibitors and, thus to a limited degree are able to determine the rate of corrosion by the consumption of the inhibitor. Although this serves as an accurate indication of the concentration of the corrosion inhibitor, it does not necessarily yield a meaningful determination of the corrosion rate of a corrodible material exposed to the inhibitor and is wasteful of inhibitors.

This invention is directed to a process and apparatus composition to overcome the shortcomings of aforedescribed corrosion monitoring techniques and is particularly designed for use in the fluid-producing wells traversing fluid producing geological formations. The heterogeneous conditions existing in such wells necessitates accurate corrosion information at downhole locations in order to facilitate the proper design of equipment, such as casing strings, producing strings and pumps, to be used during operation of the well as well as for the control of the injection of anti-corrosive agents or inhibitors. Obviously, this allows the injection of corrosion inhibitors to be geared to the actual corrosion rates and effects great savings. Further, the mechanics of the invention do not impose any limitation or obstruction on the normal operation of such wells.

It is, therefore, a primary object of the invention to provide a means for continuously monitoring the corrosion of materials disposed at inaccessible locations.

Another object of the invention is to provide a means to facilitate the economical introduction and utilization of corrosion inhibitors into inaccessible corrosive environments.

A further object of the invention is to provide a composition having a radioactive material as a tracer for continuously detecting the varying rates of corrosion of downhole elements in a fluid producing well.

Yet another and more specific object of the invention is to provide a ferrous composition having a radioactive tracer element adapted to be used in a fluid producing well and which has a corrosion rate substantially identical with ferrous parts of the well.

These and other objects of the invention will become apparent from the following description and accompanying illustrations.

Basically, the method of the present invention is directed to a process for monitoring the corrosion of corrosion sensitive materials exposed to fluid streams. The process includes incorporating a minor amount of radioactive material into a specimen which gives a resulting composition having corrosion characteristics corresponding to those of the corrosion sensitive material to be monitored. The specimen is then disposed in the fluid stream and the stream is periodically or continuously monitored to determine the entrained radioactive material loosened from the specimen therein by the corrosive elements in the environment. The amount of entrained radioactive material which can be determined by the counting rate, is then correlated with the degree of corrosion of the adjacent corrosion sensitive material, and thus serves as an accurate indication of the rates at which the material is being corroded.

In its broadest aspect, the apparatus of the present invention comprises a tracer specimen assembly for incorporation in a conduit having fluid flowing thereto. The assembly includes a tubular section having cross-sectional dimensions corresponding substantially to those of the conduit. The tubular section is provided with ends adapted to be coupled to the conduit and with an internal annular recess formed intermediate of the ends. The apparatus further includes an annular specimen dimensioned as said recess and received therein in axial alignment with the tubular section. The latter specimen, or tracer, is fabricated with a radioactive material and materials used to form the conduit so that the specimen has corrosion characteristics corresponding to those of the conduit. By coupling the ends of the tubular section in fluid communication with a conduit to be monitored, the specimen within the tubular section is subjected to the same corrosive conditions as the adjacent conduit. Thus, the specimen will corrode at a rate equal to that of the conduit and the radioactive material corroded from the specimen will be entrained in the fluid flowing through the conduit and act as a tracer of the corrosion rate. The amount of radioactive material entrained in the fluid may be sensed by a conventional radiation detector, such as a sodium iodide scintillation counter. Thereafter, the determination can be correlated to the rate of corrosion of the conduit.

In most wells penetrating underground reservoirs, the predominant structural materials are ferrous materials which form the casing strings, pumps, etc. Therefore, any practical corrosion monitoring system for wells, such as oil wells, must be compatible with ferrous materials or ferrous alloys. By compatible with ferrous materials and/or alloys, it is intended to convey that the radioactive material incorporated into the specimen used for monitoring the corrosition rate must not substantially change the corrosion characteristics of the specimen since otherwise the radioactive materials in the effluent would not be indicative of the corrosion rate of the well equipment because its corrosion rate would be modified by the radioactive material. Further, other parmeters must be satisfied if the corrosion monitoring the technique of ferrous materials is to be successful.

Probably the most difficult problem is finding a compatible radioactive material which does not modify the corrosion characteristics of the ferrous specimen when incorporated therein and yet is a gamma-emitter of the order of 1 mev. In addition, it must have a half-life sufficiently long so that it will be useful during the general service life of the well, say from 10 to 15 years. Of the 12 radio isotopes which might fit these parameters, there is a range of half-lives from 45 days or $Fe^{59}$ to greater than $5 \times 10^4$ years for $Nb^{94}$. Within the whole group of isotopes, $Co^{60}$ is unique for ferrous materials and/or alloys. All others either have half-lives which are too short, modify the corrosion characteristics of the speciment drastically or have such low gamma-emission energies that their detection is difficult in the system contemplated. Further, many of these isotopes are incapable of forming solid solutions with ferrous materials and/or alloys without significantly altering the corrosion behavior. For example, $Fe^{59}$ could be used but its short half-life and the low natural abundance and neutron cross-section of its precursor $Fe^{58}$ makes it unworkable. Further, in the range of the more attractive half-lives thereare only six isotopes in the range of 245 days for that of $Zn^{65}$ to the 16 year half-life of $Eu^{154}$. In this group of six more desirable isotopes, all but $Co^{60}$ are ruled out by various other factors, such as metallurgical incompatibility, etc.

$Co^{60}$, which is a gamma-emitter with energies on the order of 1 mev. and which forms solid solutions with ferrous materials or ferrous alloys, also has a half-life of the order of years so that the specimen replacement during the service life of the well is infrequent. Further, the $Co^{60}$ isotope is usually prepared by a neutron activation and the natural abundance and cross-section of the precursor isotope are large enough to give a sufficient amount of radioactivity with a reasonable period of irradiation. Quite by chance, cobalt itself is of modest cost which makes it ideally suited for fabricating specimens of ferrous materials or ferrous alloys to be used in corrosion monitoring in accordance with this invention.

Figure 2:
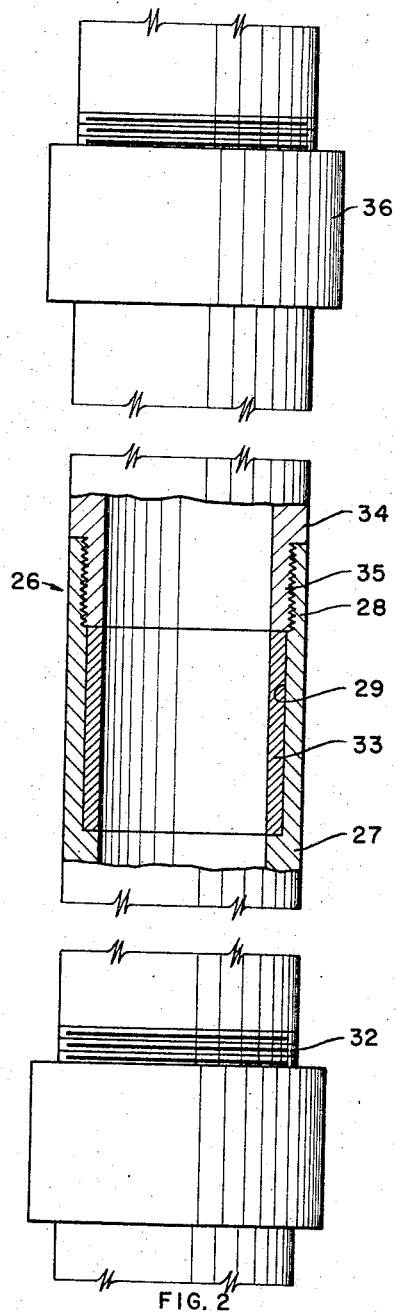

The invention will now be described in greater detail with reference to the drawings, in which:

FIGURE 1 is a vertical section of a gas lift type producing well, diagrammatically illustrating an application of the invention; and FIGURE 2 is a vertical section illustrating the details of the apparatus of the invention shown in application in FIGURE 1.

Referring now to FIGURE 1, therein is illustrated a section of the earth 10 having a surface 11 and a well bore 12 extending down from said surface into a producing formation 13. The producing formation 13 includes a section 14, which has been subjected to a corrosion inhibitor "squeeze," extending radially around the well bore 12. The well bore 12 is provided with conventional gas lift production apparatus to facilitate the removal of production fluid from the formation 13. This apparatus includes a casing string 15 extending into the well bore 12 and having perforations 16 therethrough adjacent the producing formation 13. The apparatus further includes a gas lift production string 16 extending through the casing string 15, and a wellhead assembly 18 secured to the upper ends casing string and production string.

The wellhead assembly 18 includes a conventional intermitter 21, a gas inlet line 22 and a gas and oil outlet 23. The production string 17 consists of sections 24 coupled together in axial alignment through conventional means, such as threads. Selected sections of the production string have gas lift mandrels 25 secured thereto and communicating with the interior thereof.

The tracer assembly, to which the apparatus of the present invention is primarily directed, is designated by the numeral 26. As illustrated in FIGURE 1, this assembly is coupled to the production string 17 intermediate a pair of sections thereof. The tracer assembly 26, as illustrated in detail in FIGURE 2, includes a first tubular section 27 having cross-sectional dimensions corresponding to those of the production string 17. One end of the section 27 is provided with a recessed internally threaded portion 28 terminating in an intermediate recess 29 having an internal diameter corresponding substantially to the inside diameter of the threaded portion 28. The other end of the first tubular section 27 is provided with external threads 32 adapted to be received in coupled engagement with a section of the production string 17. The tracer assembly 26 further includes an annular specimen 33 dimension as the recess 29 and received therein in alignment with the section 27. The annular specimen 33, as will be described in detail subsequently is fabricated of a radioactive material having corrosion characteristics corresponding to those of the production string 17. The annular specimen 33 is secured in position within the recess 29 through means of a second tubular section 34 having a threaded end 35 adapted to be received in the threaded portion 28 of the section 27. When the section 34 is fully threaded into the section 27, as illustrated in FIGURE 2, the end 35 of the section 34 is juxtapositioned in clamping engagement with respect to the specimen 33. Thus, the section 34 acts to clamp the specimen within the recess 29 and functions to isolate all but the interior surface of the specimen from contact with fluid flowing through the tubular sections 27 and 34 of the assembly. In order to ensure this isolation, O-ring type annular gaskets may be interposed between each of the ends of the specimen and the section in engagement therewith. The second tubular section 34 is also provided with an internally threaded end portion 36 adapted to be threadably coupled to the production string 17, as illustrated in FIGURE 1.

Although the above description is directed to the specific tracer assembly, it is to be understood that process of the present invention is not limited to the specific details of the assembly structure. The process is rather directed to the fabrication and utilization of radioactive tracer, such as the specimen 33, in the monitoring and control of the corrosion of corrodible material. Furthermore, although the specimen 33 is of a preferable form, it is to be understood that exact form of this specimen may be altered without materially departing from the spirit of the invention. For example, an annular tracer specimen having internal dimensions corresponding to those of the production string 17 could be fabricated as a thread sleeve and assembled directly into the production string as a section thereof.

Referring now to the specific details of the annular tracer specimen 33, it is noted that this specimen is fabricated to achieve corrosion characteristics corresponding to those of the conduit or production string being monitored. Furthermore, the specimen is formed so as to fit accurately within the recess 29, with the internal surface thereof flush with the internal surfaces of the tubular sections adjacent thereto and the production string sections coupled to these tubular sections. The flush mounting of the internal surface of the specimen with respect to the sections adjacent thereto is of particular advantage when the specimen is used in fluid conduit, such as a production string, since the specimen will impose no restrictions on fluid flow within the conduit. This flush mounting has the additional advantage in a production string, such as the gas lift production string illustrated in FIGURE 1, that it permits tools and replacement components to be run through the string through means of conventional methods, such as wire line lowering, without restriction. For example, in the illustration of FIGURE 1 it is anticipated that the valves within gas lift mandrels 25 may be replaced through means of a remotely actuated wire line tool.

In order to facilitate use of radioactive tracer specimen 33 for continuous and relatively long periods of time, for example from 10 to 20 years, it is necessary for the radioactive material in the specimen to have a compatible radioactive half-life. In addition to having a long half-life, the radioactive material must be capable of being irradiated to an intensity of radioactivity sufficiently high, say on the order of 1 mev., to permit the ready detection of even minor portions thereof. The latter characteristic is necessary, since the amount of the radioactive material in the specimen corroded away and entrained the fluid stream flowing therethrough, will be very small. When working with ferrous materials, the specimen should be formed of a steel corresponding to that of the conduit or production string to be monitored and from one-half to one percent by weight of cobalt 60 incorporated therein. This form of specimen proves ideal, since the cobalt 60 is readily incorporated into steel, has a half-life of approximately 5.2 years and is capable of being activated to a relatively high intensity of radioactivity, for example, one curie per gram of cobalt in a conventional reactor. The limited percent of cobalt incorporated into the specimen is necessary in order to assure that specimen will corrode at a rate equal to or substantially equal to that of the conduit being monitored. It is noted that cobalt steels having substantial amounts of cobalt incorporated therein are noticeably more corrosion resistant than corresponding steels with little or no cobalt therein.

In preparing the preferred form of the specimen 33, from one-half to one percent of inactive cobalt (e.g., cobalt 59) is incorporated into a steel specimen having a composition corresponding to that of the conduit to be monitored. This incorporation may be accomplished through any of the means well known to those skilled in the metallurgical arts. After the cobalt has been incorporated into the specimen, and before it is radioactivated, the specimen is formed into an annular or tubular section dimensioned as the recess 29. Since the specimen is not radioactive at this point, it may be worked by any of the methods well known to those skilled in the metal working art. Upon being formed into the annular shape illustrated in FIGURE 2, the specimen is subjected to a high neutron flux to activate the cobalt therein to radioactive cobalt 60. Activation may be accomplished through use of any one of the several nuclear reactors available for such use in this country, and the exact degree of neutron flux utilized is dependent on the size of specimen used and its desired useful life.

Typically, the specimen 33 may be cobalt steel tubing having a two-inch diameter, 40-mil wall thickness, and six-inch length. With such a specimen, having one-half of one percent cobalt incorporated therein, a four-week activation in a neutron flux of $1 \times 10^{13}$ n/sec. cm.$^2$ would induce 1.05 curies of cobalt 60 activity and 0.61 curie of Fe$^{59}$ activity. Neglecting the Fe$^{59}$ activity, which would decay away relatively rapidly, such a specimen would provide a readily detected cobalt 60 counting rate in the fluid passing through the specimen and up the production string, even if the corrosion rate were only 1 mil per year in a well producing 1,000 barrels of total effluent per day. It is noted that with the specimen 33 installed as illustrated in the accompanying figures, corrosion occurs only on the inside surface thereof and, therefore, a relatively thin specimen has a substantially long useful life. For example, for a corrosion rate of 4 mils per year, a specimen of 40 mil thickness would last ten years. The use of thin sectioned specimens also has the advantage that the mass of the specimen is maintained at a minimum and thus the "hot" nature of the specimen and the danger resulting therefrom is maintained at a minimum.

It is noted that the dimensions and activation of the radioactive specimen to be used with the present invention may, if desired, depart from the typical section described above. For example, if it is desired to increase the useful life of the specimen, or to use it in an environment of increased corrosiveness, the thickness of the specimen could be increased to 80 mils. For the cobalt 60 activity to last longer, effectively, one could activate at a higher neutron flux than $1 \times 10^{13}$ n/sec. cm.$^2$, activate for a period of time greater than four weeks and/or employ a longer specimen or a plurality of specimens. For example, to obtain a useful life of about 20 years, the specimen could be made 80 mils thick and activated at $4 \times 10^{13}$ n/sec. cm.$^2$ flux for four weeks, or at $1 \times 10^{13}$ n/sec. cm.$^2$ flux for sixteen weeks, or 4 specimens of 80-mil thickness activated at four weeks at $1 \times 10^{13}$ n/sec. cm.$^2$ flux could be used.

The method of the present invention will now be exemplified with reference to its application in a producing well as illustrated in FIGURE 1. Initially, the radioactive specimen 33 is fabricated in the aforedescribed manner. After fabrication, the specimen is activated and assembled into the tubular sections 27 and 34, as illustrated in FIGURE 2. It is noted that although the relatively small mass of the radioactive specimen minimizes radiation danger, it is still necessary that the specimen be handled by trained personnel after being activated. Specifically, the activated specimen should be shipped in lead containers satisfying Interstate Commerce Commission requirements and should be handled by personnel approved by the Atomic Energy Commission using appropriate shielding and long-arm handling instruments. After the specimen has been assembled into the tubular sections 27 and 34, as illustrated in FIGURE 2, the threaded ends of these sections are coupled to selected sections of the production string 17. The sections of the production string to which the assembly 26 is coupled are preferably selected so as to dispose the assembly in a location of maximum corrosion when the production string is positioned within a well. With the assembly 26 and production string 17 so assembled, the production string may be run into the producing position, as illustrated in FIGURE 1, and production of effluent fluid may be commenced in the conventional manner. It is noted that once the assembly 26 is lowered to producing position beneath the surface 11 of the earth, the radioactive specimen no longer imposes a radiation hazard to well operators, and thus special handling and personnel are unnecessary.

With the assembly disposed in a producing well, as illustrated in FIGURE 1, the corrosion rate of the production string is monitored by periodically or continuously detecting the counting rate of cobalt 60 in the effluent being removed through the production string. Generally, the counting rate is determined for a sample of the effluent produced during a preselected period of time. Various commercially available counters may be utilized for this purpose, such as a sodium iodide scintillation counter. It is noted that samples of the production effluent are so feebly radioactive that they can be handled as nonradioactive material by untrained personnel without danger. After the counting rate of a sample of effluent has been measured, it is correlated with the rate of corrosion of the specimen in the production string by determining the total weight of radioactive corrosion product in the effluent in a given time. Using this information, the corrosion rate of the specimen can readily be calculated. It is noted that this specimen is designed to corrode essentially at the same rate as the steel in the production string and, thus serves as a good indication of production string corrosion.

The correlation so determined may then be utilized to control the application of corrosion inhibitors to the producing well. Specifically, the determination may be used to control inhibitor "squeezes," such as the area indicated by numeral 14 in FIGURE 1. Typically, such "squeezes" may utilize nitrogen containing corrosion inhibitors introduced into the formation 13 through a process of reversed production within the well.

From the foregoing description, it is believed apparent that the method and apparatus of the present invention provides a means whereby the corrosion of conduit exposed to fluid stream may be both monitored and controlled. The description is, however, merely intended to be explanatory of the invention. Various changes in the details of the described method and illustrated construction may be made, within the scope of the appended claims, without departing from the spirit of the invention. For example, although the invention has been described with reference to its use in a gas lift production string, it is anticipated that the invention may be equally well applied to other conduits in varying environments.

We claim as our invention:

1. A process for controlling the rate of corrosion in a corrosion-sensitive conduit during an extended period of the production of fluids flowing therethrough from a producing well comprising the steps of:
    (a) incorporating from ½ to 1% of a radioactive material of relatively high radioactive intensity having a substantially long half-life into a specimen, said specimen having corrosion characteristics corresponding to said corrosion-sensitive conduit;
    (b) exposing the resulting specimen to the fluid steam flowing through said corrosion-sensitive conduit during the passage of said fluid through said conduit;
    (c) monitoring said fluid stream exposed to said resulting specimen to determine the counting rate of the radioactive material entrained therein; and
    (d) injecting a corrosion inhibitor into said conduit at a sufficient rate to maintain the counting rate below a prescribed level which is proportional to an acceptable corrosion rate of both said resulting specimen and said corrosion-sensitive conduit.

2. A process of claim 1 wherein the radioactive material is $Co^{60}$.

References Cited

UNITED STATES PATENTS 2,751,506   6/1956   Black et al. _____ 250—106 X
2,994,778   8/1961   Marsh _____ 250—106

ARCHIE R. BORCHELT, *Primary Examiner.*